United States Patent
Fogal, Sr.

(10) Patent No.: US 6,249,971 B1
(45) Date of Patent: Jun. 26, 2001

(54) METHOD AND SYSTEM FOR TIRE/WHEEL DISTURBANCE COMPENSATION

(76) Inventor: Robert D. Fogal, Sr., 15 Kenwood Rd., Chambersburg, PA (US) 17201

( * ) Notice: Subject to any disclaimer, the term of this patent is extended or adjusted under 35 U.S.C. 154(b) by 0 days.

(21) Appl. No.: 09/310,594

(22) Filed: May 12, 1999

Related U.S. Application Data

(60) Provisional application No. 60/085,163, filed on May 12, 1998.

(51) Int. Cl.$^7$ .................................................. B21D 53/26
(52) U.S. Cl. ........................................ 29/894.31; 29/424
(58) Field of Search ........................... 152/154.1; 156/75; 301/5.21, 5.22; 29/423, 424, 802, 894.31, 894.37, 428, 426.4

(56) References Cited

U.S. PATENT DOCUMENTS

| | | |
|---|---|---|
| 2,080,227 * | 5/1937 | Periat et al. . |
| 2,909,389 * | 10/1959 | Wilborn . |
| 3,085,924 * | 4/1963 | Nichols . |
| 3,256,123 * | 6/1966 | Hart . |
| 3,463,551 | 8/1969 | Clay . |
| 3,716,093 * | 2/1973 | Tsuchiya . |
| 3,987,833 * | 10/1976 | Powell et al. . |
| 4,027,712 | 6/1977 | Verdier . |
| 4,179,162 * | 12/1979 | Zarlengo . |
| 4,269,451 * | 5/1981 | Narang . |
| 5,073,217 | 12/1991 | Fogal . |
| 5,237,505 | 8/1993 | Beebe . |
| 5,386,857 | 2/1995 | Fogal, Sr. et al. . |
| 5,472,023 | 12/1995 | Fogal, Sr. et al. . |
| 5,766,501 | 6/1998 | Heffernan et al. . |
| 6,052,885 * | 4/2000 | Carmien . |
| 6,128,952 | 10/2000 | LeBlanc . |
| 6,129,797 | 10/2000 | Heffernan et al. . |

* cited by examiner

*Primary Examiner*—S. Thomas Hughes
*Assistant Examiner*—Trinh Nguyen
(74) *Attorney, Agent, or Firm*—Oldham & Oldham Co., LPA

(57) ABSTRACT

The invention is directed to a method for introducing a compensating material into a tire/wheel assembly by providing at least one self-contained batch of a compensating material having a predetermined amount of such material and being selectively transferable into a tire. The at least one batch of material remains substantially self-contained for shipping and handling. The at lest one batch is then transferred into the tire, and the tire is thereafter mounted onto a vehicle for operation or otherwise rotated wherein the at least one self-contained batch of material disperses the material within the tire upon rotation. The invention is also directed to a system for introducing a compensating material into a tire/wheel assembly, wherein a predetermined amount of a compensating material in a self-contained batch which remains substantially self-contained during handling, is introduced into a tire prior to assembly with a wheel, and thereafter disperses within the tire during rotation of the tire/wheel assembly. There is further provided a method of compensating for radial and lateral force variations at the tire/road footprint of a tire/wheel assembly comprising the steps of determining the size of a tire in a tire/wheel assembly and selecting at least one self-contained batch of a compensating material to provide a predetermined amount of compensating material for introduction into the interior of the tire. The predetermined amount of compensating material is introduced into the tire and then disperses upon rotation of the tire/wheel assembly.

29 Claims, 3 Drawing Sheets

METHOD AND SYSTEM FOR TIRE/WHEEL DISTURBANCE COMPENSATION

This application claim benefits to Provisional application No. 60/085,163 filed May 12, 1998.

TECHNICAL FIELD

This invention relates to a method and system for introducing a predetermined amount of a force compensating material into a wheel/tire assembly for equalizing radial and lateral force variations at the tire/road footprint of a pneumatic tire.

BACKGROUND OF THE INVENTION

A typical motor vehicle is generally characterized as comprising an unsprung mass and a sprung mass. The unsprung mass generally consists of all of the parts of the vehicle not supported by the vehicle suspension system such as the tire/wheel assembly, steering knuckles, brakes and axles. The sprung mass, conversely is all of the parts of the vehicle supported by the vehicle suspension system. The unsprung mass can be susceptible to disturbances and vibration from a variety of sources such as worn joints, misalignment of the wheel, brake drag, irregular tire wear, etc. Because vehicular tires support the sprung mass of a vehicle on a road surface and such tires are resilient, any irregularities in the uniformity or dimensions of the tire, any dimensional irregularities in the wheel rim, and/or any dynamic imbalance or misalignment of the tire/wheel assembly will cause disturbances and vibrations to be transmitted to the sprung mass of the vehicle thereby producing an undesirable or rough vehicle ride, as well as reducing handling and stability characteristics of the vehicle. Severe vibration can result in dangerous conditions such as wheel tramp or hop and wheel shimmy (shaking side-to-side).

It is now standard practice to reduce some of these adverse vibrational effects by balancing the wheel rim and tire assembly by using a balance machine and clip-on lead weights. The lead balance weights are placed on the rim flange of the wheel and clamped in place in a proper position as directed by the balancing machine. The balancing procedure can reduce imbalance in the tire/wheel assembly, however, perfect balance is rarely achieved. Balancing is not an exact art and the results are dependent upon the specific set up of a tire/wheel assembly on a specific balancer at that moment in time. Balancing is an improvement and will reduce the vibration of the tire/wheel assembly in comparison to an unbalanced tire/wheel assembly. However, even perfect balancing of the tire/wheel assembly does not necessarily mean that the tire will roll smoothly. The balancing of the tire/wheel assembly must necessarily be done in an unloaded condition. When the balanced tire is placed on the vehicle, the weight of the vehicle acts on the tire through the interface or contact area of the tire and the road surface which is commonly known as the tire footprint. Irregularities in the tire are common such that even a perfectly balanced tire can have severe vibrations due to non-uniformities in the tire which result in unequal forces within the tire footprint.

A level of non-uniformity is inherent in all tires. In the art of manufacturing pneumatic tires, rubber flow in the mold or minor differences in the dimensions of the belts, beads, liners, treads, plies of rubberized cords or the like, sometimes cause non-uniformities in the final tire. When non-uniformities are of sufficient magnitude, they will cause force variations on a surface, such as a road, against which the tires roll and thereby produce vibrational and acoustical disturbances in the vehicle upon which the tires are mounted. Regardless of the cause of the force variations, when such variations exceed the acceptable minimum level, the ride of a vehicle utilizing such tires will be adversely affected.

Balancing of the tires has also been accomplished by using methods other than balance machines and lead weights. For example, Fogal in U.S. Pat. No. 5,073,217 disclosed a method of balancing a vehicle tire/wheel assembly by introducing a pulverulent synthetic plastic material into the interior chamber of the tire wheel assembly. The pulverulent synthetic plastic material has the added effect of compensating for the radial and lateral force variations generated at the tire road interface. The movement of the pulverulent synthetic plastic material within the tire is proportional to the downward force of the vehicle weight and the centrifugal force due to the tire rotation. Also, it has been found for some tire/wheel assemblies, particularly for use with passenger vehicles, a combination of lead weight balancing or the like with the addition of a predetermined amount of material introduced into the tire/wheel assembly to compensate for radial and lateral force variations at the tire/road footprint of a pneumatic tire of a vehicle. Such disturbances are due to tire/wheel assembly imbalance, non-uniformity of the tire, temporary disturbances in the road surface, or other vibrational effects of the unsprung mass of a vehicle. The applicant's concurrently filed, co-pending U.S. patent application Ser. No. 09/405,521 entitled Method for Equalizing Balancing Radial and Lateral Force Variations at the Tire/Road Footprint of a Pneumatic Tire, which is hereby incorporated by reference describes such an approach to disturbance compensation. This approach is briefly described with reference to prior art FIG. 4 which illustrates the innumerable radial impact forces (Fn) which continuously react between the road R and the tread T at the lower portion or footprint B during tire/wheel assembly rotation. There are an infinite number of such forces Fn at virtually an infinite number of locations (Pn) across the lateral width W and the length L of the footprint B, and FIG. 4 diagrammatically illustrate five such impact forces F1–F5 at respective locations P1–P5. It is assumed that the forces F1–F5 are different from each other because of such factors as tire wear at the specific impact force location, the road condition at each impact force location, the load upon each tire/wheel assembly, etc. Thus, the least impact force is the force F1 at location P1 whereas the greatest impact force is the force F2 at location P2. Once again, these forces F1–F5 are merely exemplary of innumerable/infinite forces laterally across the tire 11 between the sidewalls SW1 and SW2 and circumferentially along the tire interior I which are created continuously and which vary as the tirelwheel assembly 10 rotates.

As these impact forces are generated during tire/wheel assembly rotation, the material 20 is adapted to relocate in dependency upon the location and the severity of the impact forces Fn. In the preferred embodiment, material 20 is a composition of dry, solid particles, wherein relocation of the particle mixture 20 through movement of the individual granules, powder and dust is also inversely related to the magnitude of the impact forces. For example, the greatest force F1 is at position P1, and due to these greater forces F1, the particle mixture 20 is forced away from the point P1 with the least amount of the particle mixture remaining at the point P1 because the load force there is the highest. Contrarily, the impact force F is the lowest at the impact force location point P2 and therefor more of the particle mixture 20 will remain there. In other words, at points of maximum or greatest impact forces (F1 in the example), the quantity of the particle mixture 20 is the least, whereas at points of minimum force impact (point P2 in the example), the quantity of particle mixture 20 is proportionately increased. This movement of material creates lift, thereby substantially equalizing the radial and lateral force variations. Accordingly, the vibrations or impact forces Fn force the particle mixture 20 to continuously move away from the higher or excessive impact areas F1 or areas of maximum imbalance F1 and toward the areas of minimum impact forces or imbalance F2. The particle mixture 20 is moved by these impact forces Fn both laterally and circumferentially, but if a single force and a single granule of the particle mixture 20 could be isolated, so to speak, from the standpoint of cause and effect, a single granule located at a point of maximum impact force Fn would be theoretically moved 180 degrees therefrom. Essentially, with an adequate quantity of particle mixture 20, the variable forces Fn create through the impact thereof a lifting effect within the tire interior I which equalizes the radial force variation applied against the footprint until there is a total force equalization circumferentially and laterally of the complete tire/wheel assembly 10. Thus the rolling forces created by the rotation of the tire/wheel assembly 10 in effect create the energy or force Fn which is utilized to locate the particle mixture 20 to achieve lift and force equalization and assure a smooth ride. Furthermore, due to the characteristics of the particle mixture 20, road resonance is absorbed as the tire/wheel assemblies 10 rotate.

While the use of a compensating material introduced into the interior of the tire has been found to work effectively, either alone or in combination with other balancing techniques, a limitation has been found in how to introduce this material into the tire. In the prior approaches, as depicted in FIG. 3, pulverulent material 20 deposited in mound M is suspended in an air stream and introduced into a tire through a hose line (not shown) and valve stem 14 of tire valve 13 used for inflation of tire 11. Although such an approach works sufficiently, this method of delivery of a compensating material is in some instances an inconvenient delivery method, and may result in contamination of a work place where a wheel assembly is being balanced. This delivery system has further been utilized in the aftermarket environment to facilitate balancing of replacement tires, and no effective approach to introducing such material into a tire/wheel assembly at original manufacture has been provided.

There is therefore a need for an improved method and system for delivery of a compensating material into the interior of a tire, in a simple and effective manner.

SUMMARY OF THE INVENTION

It is therefore an object of the present invention to provide a method and system for introducing a compensating material into the interior of a tire to provide compensation for radial and lateral force variations at the tire/road footprint.

It is a further object of the invention to provide a method and system for introducing a compensating material into the interior of a tire in a premeasured amount, allowing an operator to easily introduce the material and without possible contamination of the work environment.

Another object of the invention is to provide a method of introducing a predetermined amount of a compensating material into a tire based upon the characteristics of the tire/wheel assembly.

These and other aspects and objects of the invention are provided by a method for introducing a compensating material into a tire/wheel assembly comprising the steps of providing at least one self-contained batch of a compensating material, the at least one self-contained batch comprising a predetermined amount of compensating material and being selectively transferable into a tire when the tire is not mounted on the wheel of the assembly. The at least one batch remains substantially self-contained for handling. The at least one batch is then transferred into the unmounted tire, and the tire is thereafter mounted onto the wheel.

The invention according to another aspect provides a system for introducing a compensating material into a tire/wheel assembly comprising a predetermined amount of a compensating material in a self-contained batch wherein said batch is adapted to remain substantially self-contained during handling and for introduction into a tire prior to assembly with a wheel, and thereafter disperses within the tire during rotation of the tire/wheel assembly.

The invention is also directed to a method of compensating for radial and lateral force variations at the tire/road footprint of a tire/wheel assembly comprising the steps of determining the size of a tire in a tire/wheel assembly and selecting at least one self-contained batch of a compensating material to provide a predetermined amount of compensating material for introduction into the interior of the tire. The predetermined amount of compensating material is introduced into the tire prior to mounting of the tire to the wheel, and thereafter, the tire is mounted to the wheel for operation on a vehicle.

BRIEF DESCRIPTION OF THE DRAWINGS

This invention will now be described in further detail with reference to the accompanying drawings, in which.

DESCRIPTION OF THE PREFERRED EMBODIMENT

This invention will now be described in detail with reference to preferred embodiments thereof.

Figure 2:
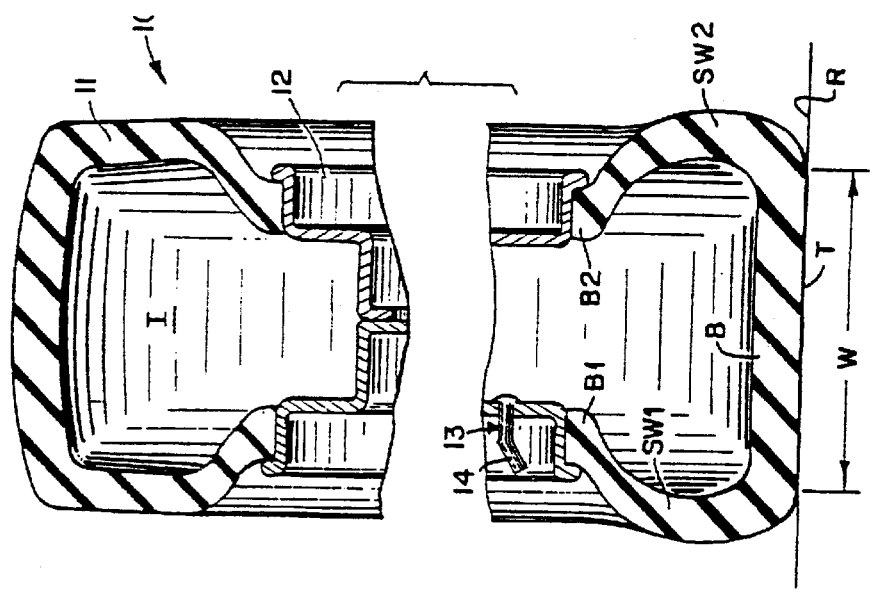
FIG. 2 is an axial vertical cross sectional view through the wheel assembly of FIG. 1 and additionally illustrates the lateral extent of the footprint when the tire rests under load upon the road surface.
Figure 1:
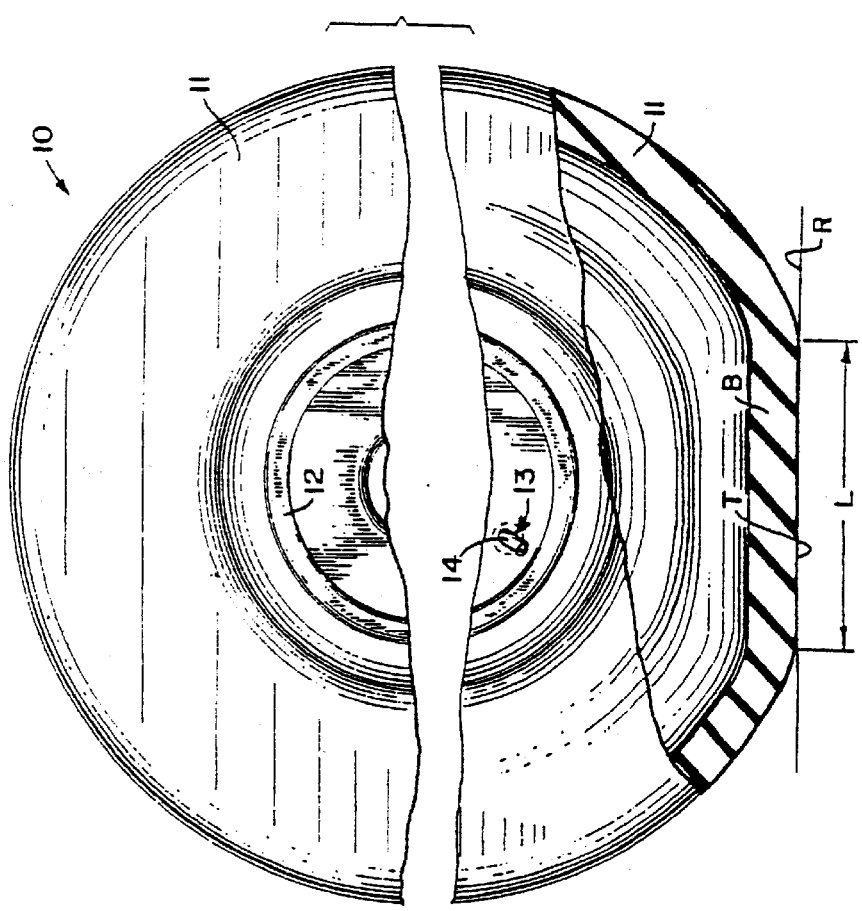
FIG. 1 is a fragmentary side elevational view of a conventional wheel assembly including a tire carried by a rim, and illustrates a lower portion or "footprint" of the tire tread resting upon and, bearing against an associated supporting surface, such as a road.
Figure 4:
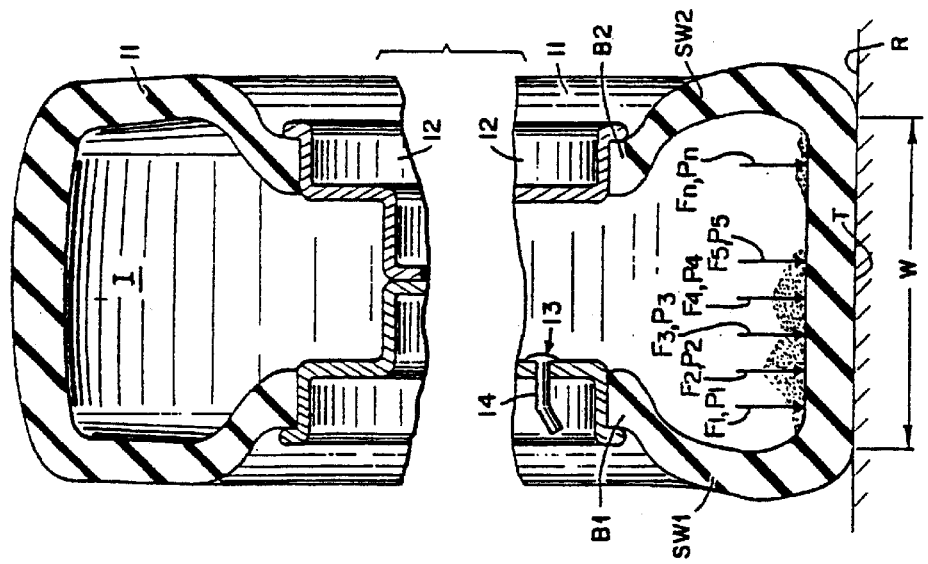
FIG. 4 is a cross sectional view of the wheel assembly of FIG. 3 during rotation, and illustrates a plurality of radial load forces of different variations or magnitudes reacting between the tire and the road surface as the tire rotates, and the manner in which the polymeric pulverulent material is forced from the position shown in FIG. 3 in proportion to the variable radial impact forces.
Figure 3:
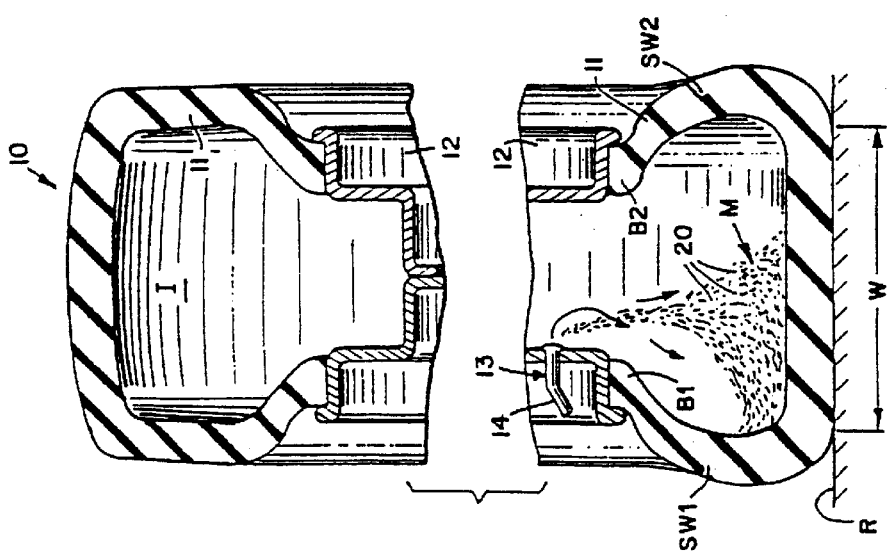
FIG. 3 is an enlarged cross sectional view identical to FIG. 2, and illustrates the manner in which synthetic polymeric resin pulverulent material is deposited with an interior of a tire through an associated tire valve.

Reference is first made to FIGS. 1 and 2 of the drawings which illustrate a conventional wheel assembly generally designated by the reference numeral 10 defined by a tire 11 and a metal rim 12 carrying a tire valve or air valve 13 which includes a stem 14 having an internal thread. Under normal operating/road conditions, a valve core may be threaded into the stem 14 of the tire valve 13. The valve stem 14 may also include a conventional external thread. The tire 11 is a radial tire. A biased tire essentially does not flex radially whereas a radial tire tends to flex radially, and in use the latter can be evidenced by sidewalls SW1, SW2 (FIGS. 1, 2, 3 and 5) which tend to bulge outwardly under load when resting or running upon a surface, such as a road R. The amount of flex will vary depending upon such things as the total load of the vehicle, the speed of the vehicle, etc. and the load force can vary from wheel assembly to wheel assembly both in smaller passenger vehicles and larger vehicles, such as tractor trailers. For example, a fully loaded tractor trailer traveling at sixty miles an hour carrying heavy steel has a greater radial load force and therefore greater tire flex than the same tractor trailer traveling unloaded, as occurs quite often in the hauling industry. Furthermore, as the load increases, the flex of the tire increases and the overall radius decreases. Obviously, if a wheel assembly was conventionally "balanced" by utilizing lead weights applied to the rims, the lead weights would be effective to achieve balancing for a particular load and for a limited speed range, but not for the full variations in load force and all speeds. Similarly, in passenger vehicles with much lower gross vehicle weights, radial and lateral force variations may occur due to any irregularities in the uniformity or dimensions of the tire, any dimensional irregularities in the wheel rim, and/or any dynamic imbalance or misalignment of the tire/wheel assembly. Such disturbances and vibrations will be transmitted to the sprung mass of the vehicle, producing an undesirable or rough vehicle ride, as well as reducing handling and stability characteristics of the vehicle.

Therefore, even when tire/wheel assemblies are balanced with today's sophisticated electronic balancing machines the wheels are not balanced for all speeds and all radial force variations. It is therefore desirable in both large tractor/trailer tire/wheel assemblies and smaller passenger vehicle tire/wheel assemblies to provide for dynamic compensation of radial and lateral force variations by introducing a compensation material into the tire.

The radial tire 11 includes a lower tire portion or a footprint B defined by a length L and a lateral breadth or width W which collectively define the instantaneous cross sectional area of the tire lower portion B in engagement with the supporting surface or road R when the wheel assembly 10 is stationary or is rotating. The tire T includes a conventional external tire tread T and beads B1, B2 of the respective sidewalls SW1, SW2 which engage the rim 12 in a conventional manner.

If the wheel assembly 10 and similar wheel assemblies associated with a vehicle (not shown) are not properly/perfectly balanced, the attendant unbalanced condition thereof during vehicle wheel rotation will cause the tires to wear unevenly, wheel bearings will wear excessively, shock absorbers operate at inordinately higher amplitudes and speeds, steering linkages/mechanisms vibrate excessively and become worn and overall vehicle ride is not only rough and dangerous, but also creates excessive component wear of the entire vehicle. These problems are significant in automobiles, and are magnified in association with extremely large tires, such as truck tires, which are initially very expensive and if uncared for through unbalanced running, would adversely affect truck tire life, safety, and just as importantly, tire retreading.

Obviously, even if the wheel assembly 10 was balanced as perfectly as possible with lead weight, whether by static or dynamic balancing, as road conditions change, as the tire 11 wears, as the load of the vehicle changes, etc., the "perfect" balanced condition of the wheel assembly 10 is far less than perfect. Accordingly, not only must the wheel assembly 10 be balanced, but it is desired that the balanced condition be retained during operation to stay in balance in response to variations in road conditions, load forces, changes in speed, etc., as might occur in conventional utilization as, for example, in the case of a loaded versus an unloaded tractor trailer. Thus, as forces vary during rotation of the wheel assembly 10 relative to the road R, the force variations are desirably compensated for dynamically using a compensating material within the tire which dynamically moves within the tire to facilitate maintaining load force equalization.

According to the present invention, a reduction in both radial and lateral forces acting on a tire/wheel assembly can be achieved through the incorporation of a compensating material, preferably in the form of a dry lubricant in combination with a primary pulverulent material having a mesh size range between 8 and 200. For purposes of this invention, the concept of balancing a vehicle and reducing radial and lateral forces acting on a tire shall be referred to as "total wheel balancing". Although the invention will be described with reference to particular compensating materials comprising dry particulates, compensating material within the scope of this invention includes liquids, particulate solids, and combinations thereof.

The primary or principal ingredient material in a solid compensating material composition of the present invention may be either an inorganic material or an organic material in generally a particulate or more specifically a pulverulent form. Particulate materials are those formed by any process resulting in relatively small, discrete solids. Such processes include but are not limited to precipitation, polymerization, spraying, solidification, and comminution. Pulverulent materials are those particulate materials that have been reduced in size through a suitable size reduction process, such as grinding, abrading, or other comminution processes. Suitable inorganic materials include, for example, powdered carbon, iron powder or filings, other metallic particles such as lead shot, talc, and calcium carbonate (e.g., limestone or calcite). Organic materials are for the most part polymeric. The polymeric material is in a particulate or pulverulent form which may be either granules, a powder, or a dust.

Any compensating material that is stable and remains free flowing over all conditions of tire usage, and has a specific gravity greater than 1 may be suitable as a compensating material according to the present invention. In the preferred embodiment, a particulate material comprised of particles in sizes to be discussed below, can be used as a compensating material. An important requirement is that the particulate material must be more thermally stable than the tire in which it is used under all tire operating conditions.

Organic polymeric materials for the practice of this invention may be either homopolymers (polymers of one monomer) or copolymers (polymers of two or more monomers). Probably, they are either thermoset or thermoplastic, although any material which is stable over the range of temperature extremes to which the tire is subjected is contemplated.

Thermoset resins useful in the practice of this invention include urea-formaldehyde, melamine-formaldehyde, and phenolic resins. All of these are known molding compounds which are available in either granular or powdered form. Urea-formaldehyde and melamine-formaldehyde molding powders commonly contain a filler, particular alpha-cellulose.

Suitable thermoplastic polymers include polyvinyl chloride and vinyl chloride-vinylidene chloride copolymers (which normally contain a major amount of vinyl chloride and a minor amount of vinylidene chloride), both of which may be plasticized; and nylon. Aramid fibers may also be used in the practice of this invention. Both nylon and aramid are polyamides, although they have quite different chemical composition and properties.

A particularly preferred pulveralent material is polymerized urea-formaldehyde thermoset resin, available in granular, powder, or dust form. One such material is available under the tradename POLYPLUS manufactured by U.S. Technology Corporation of Canton, Ohio. This pulverulent material is non-volatile, nontoxic, noncorrosive and includes the characteristics shown in the table below.

TABLE

| | |
|---|---|
| Hardness (Barcol) | 54 to 62 |
| Hardness (Rockwell) | M 110–120 |
| Hardness (MOHS Scale) | 3.5 |
| Specific Gavity (g/cc) | 1.47–1.52 |
| Bulk Density | 58–60 |
| Ignition Temperature | 530° C. |
| Thermal Decomposition | 450° C. |
| Maximum Operating Temperature | 300° F. |
| Izod Impact | ASTM D256A-0.25-0.40 |
| Water Absorption (ASTM D570-24 hr.) | −0.4%-0.8% |
| Water Absorption (MIL-A-85891A) | −Max 10% |
| Chemical Nature | Inert |

A preferred pulverulent material is composed of polymerized urea molding compound (70% by weight, alpha cellulose filler (28% by weight) and pigments and additives (2% by weight). Although the preferred compound is 70% urea, 28% alpha cellulose and 2% additives, 100% urea formaldehyde or combinations of various materials (examples of which have been disclosed above) are possible. Again, the invention contemplates a wide variety of suitable materials having the physical characteristics as described above, and no limitation is intended in relation to the preferred compensating materials set forth herein.

Particle sizes of a preferred particulate material used in the practice of this invention may range broadly from about 8 to about 425 mesh (U.S. Standard screen size). Additionally, the material may comprise a polymodal distribution of particle sizes, including material in different particle size ranges. Other formulations of compensating materials are described in more detail in the applicant's co-pending International patent application No. PCT/US00/12896, entitled Composition for Equalizing Radial and Lateral Force Variations at the Tire/Road Footprint of a Pneumatic Tire, filed concurrently herewith, and incorporated by reference herein. Good results are obtainable with a blend or distribution of particle sizes within this range. Fine particles move more quickly in response to small radial and lateral forces, while large particles move more slowly and in response to greater forces. Using particles within at least two distinct sizes or size ranges, so that different size particles will move in reaction to differing amount of forces. For example, it is believed that the smaller particles will move first in response to smaller forces. The larger particles then move in sort of a second stage of balancing or equalizing when forces are greater. One may use a particle blend having a bimodal particle size distribution, e.g., a blend of relatively coarser particles having particle sizes 20–40 mesh blended with relatively finer particles which are predominantly from 50–100 mesh.

The particles must have a specific gravity greater than 1 so that they will move positively and as quickly as possible from one place to another in response to external force. It has also been found that the addition of dry powder lubricant or anti-agglomerating agents can significantly increase the effectiveness of the principal particulate material. The dry lubricant acts to coat the interior surface of the tire as well as the primary particulate material particles. In this way particle-particle friction of the particulate material is reduced as is friction at the particulate particle-tire surface interface. The reduced friction allows the particulate material to respond more quickly in equalizing radial and lateral forces acting on the vehicle wheel assembly.

When present in a sufficient amount the dry lubricant serves as a vehicle within which the pulverulent material may freely flow or move laterally and circumferentially within the tire. Further due to the extremely fine particle size of the lubricant, quantities of the lubricant itself may quickly move to positions within the tire in order to equalize radial and lateral forces acting on the vehicle wheel assembly. Other anti-agglomerating agents to function in this manner are also contemplated.

Presently, preferred dry lubricants or anti-agglomerating agents are selected from a group of materials which include talc (or talcum), graphite, molybdenum disulfide, polytetrafluoroethylene, as well as various polymers, metals, metal oxides and salts which are known for use as solid lubricants. As with the primary pulverulent material, the lubricant is to be thermally and chemically stable at all operating conditions of the tire and must be chemically and physically compatible with the primary pulverulent material. Currently of these materials, the most preferred lubricant is talc.

In another embodiment, a wheel balancing material may be in the form of a liquid or a liquid/solid combination, as described in U.S. Pat. No. 3,463,551, the teachings of which are fully incorporated by reference.

Figure 5:
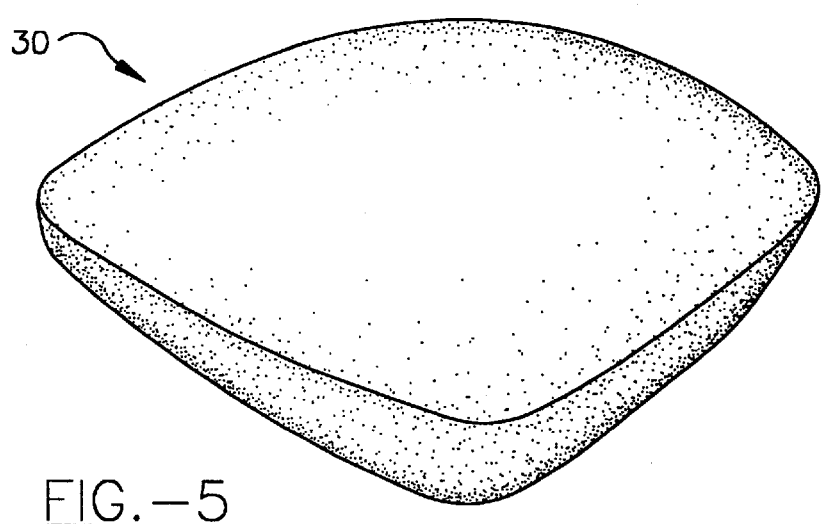
FIG. 5 shows a preferred embodiment of a self-contained batch of compensating material for introduction into a tire according to the invention.
Figure 6:
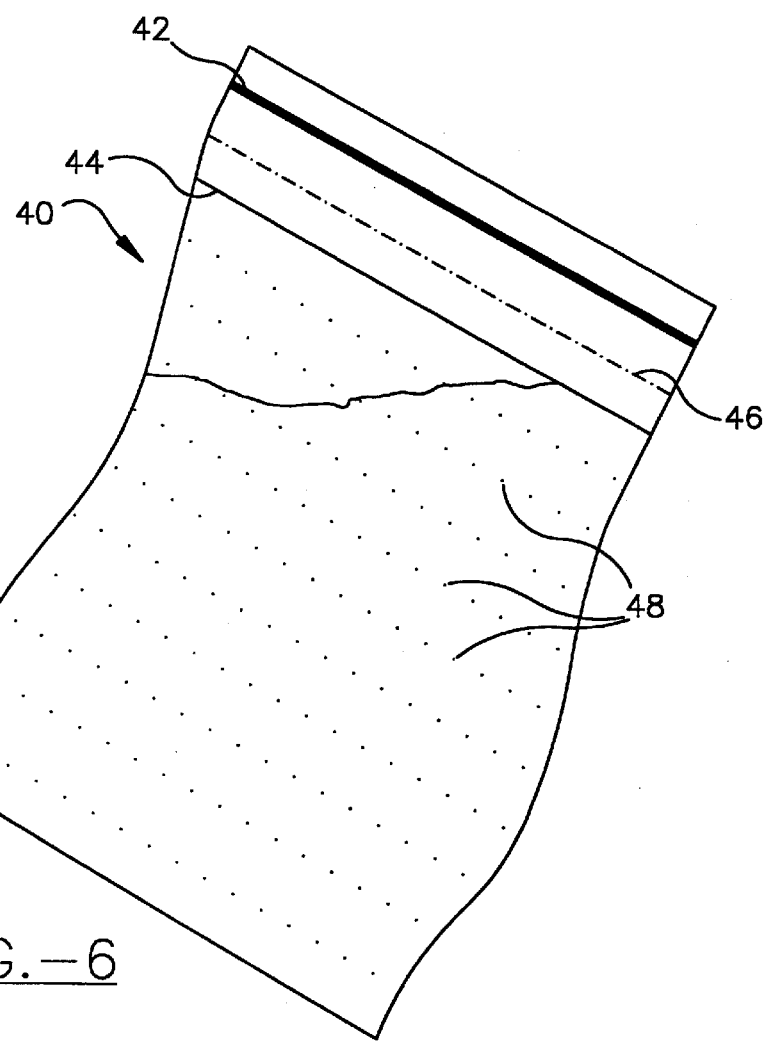
FIG. 6 shows another preferred embodiment of a self-contained batch of compensating material for introduction into a tire according to the invention.

Referring to FIGS. 5 and 6, compensating materials according to the invention as above described are formed into self-contained batches comprising larger masses or agglomerates, as for example, pellets, briquettes, extrudates, or self-contained packages of free-flowing particulates or liquids for charging into a pneumatic tire. These larger masses or agglomerates comprise a plurality of particles, usually a large number of particles, which in the embodiment of FIG. 5 are either coherently or adherently held together tightly enough for shipping, handling and charging into a tire without premature disintegration. In FIG. 5, a briquette 30 comprises a predetermined amount of compensating material packaged in a convenient form for handling and introduction into a tire prior to assembly with a wheel by simply placing the briquette 30 into the tire interior. Upon subsequent mounting of the tire onto a wheel and the mounting of the tire/wheel assembly on a vehicle, rotation of the assembly will cause the briquette 30 to break down into the individual particles from which it is made. The formation of the briquette 30 may be performed by typical processes to temporarily bind the individual particles together into a form which is easily handled and allows a predetermined amount of compensating material to be easily chosen and added to the tire. The binding of the particles together in the briquette 30 allows the particles to stay together for shipping and handling, but once introduced into the tire, the agglomerate will disintegrate, releasing individual particles, which then perform their compensating and vibration damping function in the manner described. Thus a batch of compensating material is self-contained in the embodiment of FIG. 5, with the agglomerate of material retaining its agglomerated form during shipping, handling, and charging without substantial loss of particulate material, i.e, the batch remains substantially self-contained until after a tire containing the batch is mounted on a wheel and the wheel is rotated at high speed, such as during operation of the vehicle.

In order to introduce wheel compensating material in the form of agglomerates into a tire in an amount sufficient to equalize radial and lateral forces of a wheel assembly, it is necessary to introduce at least one self-contained batch, and it may be necessary to introduce more than one self-contained batch, as in the form of pellets, or a single self-contained batch, as in the form of a briquette 30. A self-contained batch is preferably sized such that it may be introduced into a tire as one batch (such as a briquette) or in a plurality of batches (such as pellets). The number of self-contained batches required to provide the desired compensation of radial and lateral force variations at the tire/road footprint will in turn be dependent on the characteristics of the tire/wheel assembly 10 as well as the characteristics of the vehicle on which the assembly is to be used. For example, the amount of compensating material required to provide the desired compensation function will increase as the size of the tire increases and as the gross vehicle weight increases. Further, it may be determined that a tire is imbalanced to a certain extent which would require a greater amount of compensating material. Other characteristics of a tire/wheel assembly, such as non-uniformity may also vary the amount of compensating material required. Thus, according to the invention, the self-contained batches of material may be formed in a variety of predetermined sizes to allow the desired amount of material to be easily chosen and introduced into the tire of a particular tire/wheel/vehicle combination simply and effectively. In general, the preferred amount of the preferred compensating material for passenger and light truck vehicles is in a range of 0.20–2.0 ounces while larger vehicles may use a larger amount, such as between 1.5–24 ounces. These amounts may vary depending on particular characteristics of the tire/wheel/vehicle. More particularly, the following ranges of the preferred compensating material are generally found to be effective for the following tire sizes. For a 13" tire/wheel, an amount of compensating material for incorporation therein may range from about 0.2–0.6 ounces. A 14" tire/wheel may require an amount of compensating material in the range from about 0.4–0.9 ounces, while a 15" tire/wheel may require between 0.8–1.4 ounces. For a 16" tire/wheel, the amount of compensating material that may be required may range from about 1.0–1.7 ounces, while a 17" tire/wheel may require an amount in the range from about 1.2–2.0 ounces. For truck tires, the amount of compensating material that would be desired for compensating radial and lateral force variations may lie in the range between 2.0–6.0 ounces. Again, depending on the material itself as well as the characteristics of the tire/wheel/vehicle, the amount of material desired may vary. In general, the amount of material is sufficient to balance a wheel assembly and compensate for radial and lateral force variations at the footprint. Thus, as tires of any size, ranging from passenger car tires to truck tires, can be treated with a composition according to this invention for the purpose of balancing a wheel assembly and/or equalizing load forces. The amount (or weight) of powdered material per tire to be used will vary over a wide range, depending on the size of the tire and the amount that the tire is out of balance, whether this amount be expressed as a suitable range or as an optimum amount. A suitable amount of material to be used can be determined empirically, and indeed may require determination empirically, since the amount that a tire is out of balance is determined empirically.

Based on the above, the self-contained batch of compensating material within the scope of this invention will allow the desired amount of material to be added by positioning one or more of the self-contained batches on the interior of the tire. The briquette 30 may thus be formed in a single size, with one or more then used to achieve the desired amount, or could be produced in a predetermined amount for each tire size as an example. Minor adjustments of the amounts used could also be supplemented by small pellets or the like to fine tune the amount for a particular tire/wheel assembly.

In the embodiment of FIG. 5, the composition of an agglomerate (e.g., a pellet, briquette, or extrudate) may be either (1) a binderless agglomerate in which particles are self-adhesively held together, (2) an agglomerate comprising particles, such as pulverulent material, and a binder, or (3) a coated product.

A binderless pellet or briquette consisting essentially of 100% pulverulent or other particulate material self-adhesively held together as above described, is a composition according to this first embodiment. The pulverulent or other particulate material must be sufficiently self adhesive to form binderless agglomerates such as pellets or briquettes.

Pellets can be prepared by compressing an initially particulate material, which is typically light and bulky, into pellets of desired size and shape (e.g., spherical) on a pellet mill. Briquettes can be formed by shaping a particulate material with heat and pressure in a briquetting mold. Other pre-formed shapes can be produced using continuous forming processes such as extrusion followed by chopping. Binderless pellets, briquettes, and extrudates require a starting particulate material which is sufficiently cohesive so that the resulting pellet, or briquette, or extrudate will retain the structural integrity until charged into a tire according to this invention. Also, the processing conditions (e.g., degree of compression) must be such that the pellet, briquette, or extrudate remain substantially self-contained during shipping, handling, and charging into a tire, but will break apart in a tire upon rotation of the tire, releasing individual particles which will then perform their desired function. Depending on the compensating material, these processing conditions would be readily determined by one of ordinary skill in the art without undue experimentation.

A second type of composition comprises particles of pulverulent material and a binder. The binder holds particles of pulverulent material so that a coherent mass such as a pellet, briquette, or extrudate can be formed. Binders may be either inorganic or organic. For instance, certain resinous materials are capable of performing this function. Certain inorganic materials, as for example sodium silicate ("water glass") can also be used. Typically, the binder will be soft at high temperature and hard at room temperature. The binder ordinarily constitutes from about 1 to about 20% of total composition weight, more typically from about 2% to about 10% by weight.

A third form of composition according to this invention is a coated product. The coating material may be either abradable or thermally activated. An abradable coating is one which would undergo rupture or disintegration due to mechanical forces placed on it in a rotating tire. An abradable material may be either a thin polymer or an inorganic coating material. Inorganic coating materials include liquid sodium silicate. A thermally activated coating material is one having a low melting temperature, lower than that attained in a tire due to heat build up in normal operation of a vehicle. A number of low melting temperature materials are suitable. The coating material may coat either individual particles or may form an outer layer of a pellet or briquette, the particles of pulverulent material forming the interior. In either case the amount of coating agent will be from about 1% to about 20% by weight, based on total composition weight, and more preferably, from about 2% to about 10% of total composition weight.

The compositions above described may be formed by known procedures.

Pellets, briquettes and other agglomerates or extrudates according to this invention may be made of any convenient size and shape. Pellets are typically either spherical or ellipsoidal. Briquettes are typically pillow shaped as shown in FIG. 5. Extrudates are typically cylindrical. None of these shapes is critical. Size also is not critical, except that an agglomerate should be no larger than is necessary to contain wheel compensating material sufficient to charge a given tire size using one self-contained batch. An agglomerate can be small enough to permit charging of a plurality of self-contained batches.

In another embodiment as shown in FIG. 6, a self-contained batch of particulate wheel compensating material is made in the form of a bag 40 containing free flowing compensating material. A bag is also suitable as a self-containment form for liquid and liquid/solid materials. A bag is preferably made of a material that will abrade, tear or shred upon rotation of an assembled wheel. Suitable materials include generally paper and plastic. In FIG. 6, the bag 40 is designed to contain a predetermined amount of compensating material to allow shipping, handling and charging of a tire/wheel assembly without substantial loss of material, and then to break down to release the free-flowing particles or other material. In an embodiment of bag 40, a paper material may be used to form bag 40 in a conventional manner using form, fill and seal equipment. In such equipment, bag 40 is produced with an initially open top, the compensating material is placed therein, and the top is then sealed. In a particular example, a 20 lb. paper was used to form bag 40, with the edges thereof hot sealed using a 5 lb. low density polyethylene glue. Other paper weights or glues may also be suitable for a given tire/wheel assembly. Thus a bag of compensating material is self-contained in that it will retain substantially all of the material batch in the bag until the bag is transferred into a tire.

Also in this embodiment, the bag 40 may be produced of a polymeric film, similar to typical poly bags. In such an embodiment, the edges of the bag can be easily heat sealed, eliminating any requirement for glueing. The bag 40 can also be double-sealed to facilitate handling and also subsequent degradation of the bag to release the compensating material. In such an embodiment, a primary seal 42 can be formed at the top edge of bag 40. The seal 42 would preferably be a relatively strong seal to withstand shipping and handling. A secondary seal 44 may also be provided in the bag 40, which preferably would be a weaker seal, being more easily opened to release material from within the bag 40. In use, the primary seal could be torn away or otherwise removed for charging of a tire, leaving only the secondary seal 46 which will easily release material upon subsequent rotation of the assembly. To facilitate this, a perforation line 46 could be formed between seals 42 and 44. Other suitable sealing techniques to facilitate this process are also contemplated.

In a further embodiment of a self-contained batch using a container such as a bag 40 for the free-flowing material, may also use perforations 48 in the bag material (whether paper or polymeric) if desired, to facilitate shredding of the bag 40 and release of the compensating material. Such perforations can be formed using conventional perforating equipment. It should be understood that any such perforations would have to be of a character to not allow the escape of material from within the bag 40 until bag 40 has been charged into a tire. The perforations, or microperforations, if any, are sufficiently small to prevent loss of wheel compensating material through the perforation holes, but also facilitate shredding of the bag 40 upon rotation of the tire.

Use of a bag is preferential for materials that are not easily agglomerated, such as metal shot and other metallic materials. Use of a bag as a containing means is not therefor limited and can be used for any compensating material including particulate or pulverulent material, liquid materials or combinations within the scope of this invention.

Self-contained batches such as agglomerates and bags of material according to this invention may be charged or introduced into a tire in any desired fashion. If the self-contained batches were formed in the proper size such as small pellets, it may be possible to introduce such pellets into a tire through its valve. It will usually be more convenient, however, to use larger size agglomerates (pellets, briquettes, or extrudates) or bags and to introduce them into a tire before the tire is mounted on a rim to form a wheel assembly. The self-contained batch of material can be introduced into the tire prior to assembly with a wheel, either at original manufacture or during replacement or repair. Introduction or transfer of self-contained batches into a tire can be by manual transfer or by automatic, machine transfer.

While this invention has been described with reference to preferred embodiments thereof, it shall be understood that such description is by way of illustration and not by way of limitation.

What is claimed is:

1. A method for introducing a compensating material into a tire/wheel assembly comprising the steps of:

providing a tire;

providing at least one self-contained batch of compensating material comprising a predetermined amount of said compensating material in a form preventing said compensating material from freely flowing apart from said self-contained batch;

transferring said at least one self-contained batch of compensating material into an interior of said tire; and mounting said tire on a wheel to form a tire/wheel assembly;

wherein compensating material is released from said form of said at least one self-contained batch such that said predetermined amount of compensating material is able to freely flow within said tire/wheel assembly.

2. The method of claim 1, wherein said compensating material is a particulate material.

3. The method of claim 2, wherein said particulate material comprises a polymer.

4. The method of claim 2, wherein said particulate material comprises urea formaldehyde resin and cellulose filler.

5. The method of claim 2, wherein said particulate material comprises a metallic material.

6. The method of claim 2, wherein said particulate material comprises an inorganic material.

7. The method of claim 1, wherein said compensating material comprises at least in part a liquid material.

8. The method of claim 1, wherein said self-contained batch is provided in at least one device to contain said material, wherein said device is destroyed to release said material.

9. The method of claim 8, wherein said at least one device to contain said material is at least one bag.

10. The method of claim 9, wherein said at least one bag is a paper or plastic bag.

11. The method of claim 8, wherein said at least one device is adapted to release said compensating material after positioning thereof inside said tire and upon rotation of said tire/wheel assembly.

12. The method of claim 8, wherein said device is made of a material which will break down upon being rotated within said tire/wheel assembly to release said compensating material.

13. The method of claim 9, wherein said bag has a plurality of perforations therein.

14. The method of claim 9, wherein said bag has a primary seal and a secondary seal, wherein said primary seal is a relatively stronger seal than said secondary seal.

15. The method of claim 14, wherein said primary seal is removed prior to introduction of said bag into a tire.

16. The method of claim 1, wherein said form preventing said compensating material from freely flowing outside of said self-contained batch comprises an agglomerate.

17. The method of claim 16, wherein said agglomerate is selected from the group consisting of pellets, briquettes, and extrudates.

18. The method of claim 16, wherein said agglomerate is comprised of particles which are self-adhesively held together.

19. The method of claim 16, wherein said agglomerate is comprised of particles held together with a binder.

20. The method of claim 16, wherein said agglomerate is comprised of particles held together using an exterior coating surrounding said particles.

21. The method of claim 1, wherein said transferring step is selected from the group consisting of manual transfer and machine transfer.

22. A method of compensating for radial and lateral force variations at the tire/road footprint of a tire/wheel assembly comprising the steps of:

determining the size of a tire to be used in a tire/wheel assembly, providing a predetermined amount of compensating material in at least one self-contained batch in a form preventing said compensating material from freely flowing apart from self-contained batch, putting said self-contained batch into an interior of said tire, mounting said tire on a wheel to form a tire/wheel assembly, mounting said tire/wheel assembly on a vehicle, wherein said compensating material is released from said self-contained batch and disperses within said tire/wheel assembly to provide compensation of said force variations.

23. A method for introducing a compensating material into a tire/wheel assembly comprising the steps of:

providing a tire;

providing at least one self-contained batch of compensating material, said at least one self-contained batch comprising at least one bag containing a predetermined amount of said compensating material, wherein said at least one bag is a paper or plastic bag;

placing said at least one bag into an interior of said tire;

mounting said tire on a wheel forming a tire/wheel assembly; and mounting said tire/wheel onto a vehicle;

whereby said at least one bag becomes ruptured to release said compensating material within said tire/wheel assembly.

24. The method of claim 23, wherein said compensating material is a particulate material.

25. The method of claim 24, wherein said particulate material comprises a polymer.

26. The method of claim 24, wherein said particulate material comprises urea formaldehyde resin and cellulose filler.

27. The method of claim 23, wherein said compensating material comprises a metallic material.

28. The method of claim 23, wherein said compensating material comprises an inorganic material.

29. The method of claim 23, wherein said at least one bag breaks down upon operation of said tire/wheel assembly.

* * * * *